US008595887B2

(12) United States Patent
Hiltmann (10) Patent No.: US 8,595,887 B2
(45) Date of Patent: Dec. 3, 2013

(54) BRUSH

(76) Inventor: Werner Hiltmann, Zuzgen (CH)

( * ) Notice: Subject to any disclaimer, the term of this patent is extended or adjusted under 35 U.S.C. 154(b) by 99 days.

(21) Appl. No.: 12/996,713

(22) PCT Filed: Jun. 4, 2009

(86) PCT No.: PCT/CH2009/000184
§ 371 (c)(1),
(2), (4) Date: Dec. 7, 2010

(87) PCT Pub. No.: WO2009/149569
PCT Pub. Date: Dec. 17, 2009

(65) Prior Publication Data
US 2011/0088186 A1   Apr. 21, 2011

(30) Foreign Application Priority Data

Jun. 14, 2008  (CH) ........................................ 901/08

(51) Int. Cl.
*A46B 9/02*          (2006.01)
(52) U.S. Cl.
USPC .................................. 15/187; 15/186; 15/188
(58) Field of Classification Search
USPC ............ 15/106, 110, 187, 188, 186; 132/112,
132/113, 114, 115, 116; 119/613, 614, 616,
119/625, 632, 664
See application file for complete search history.

(56) References Cited

U.S. PATENT DOCUMENTS

| 170,734 | A | * | 12/1875 | Hotchkiss | 119/613 |
| 205,374 | A | * | 6/1878 | Foss | 15/188 |
| 4,343,265 | A | * | 8/1982 | Belschner | 119/633 |
| 4,480,351 | A | * | 11/1984 | Koffler | 15/187 |
| D294,887 | S | * | 3/1988 | Young | D4/120 |
| 4,757,571 | A | * | 7/1988 | Young | 15/167.3 |
| 5,485,807 | A | | 1/1996 | Bertwell et al. | |
| 5,655,482 | A | | 8/1997 | Lundquist | |
| 5,960,745 | A | | 10/1999 | Boyland | |
| 6,553,603 | B1 | * | 4/2003 | Jolly | 15/161 |
| 7,174,595 | B2 | * | 2/2007 | Chen | 15/110 |
| 7,198,048 | B2 | * | 4/2007 | Johnson | 132/125 |
| 7,363,675 | B2 | * | 4/2008 | Gavney, Jr. | 15/121 |

(Continued)

FOREIGN PATENT DOCUMENTS

FR            719 709 A      2/1932

OTHER PUBLICATIONS

International Search Report (PCT/ISA/210) for PCT/CH2009/000184 dated Sep. 25, 2009.

*Primary Examiner* — Monica Carter
*Assistant Examiner* — Michael Jennings
(74) *Attorney, Agent, or Firm* — Buchanan Ingersoll & Rooney PC (57) ABSTRACT

A multipurpose brush has an ergonomically formed, substantially plate-shaped and elastically deformable brush body with a substantially flat top side and a substantially flat bottom side and curved side edges. Elastic, substantially conical grooming elements are arranged at the bottom side. At the top side of the brush body there are tooth-like combing elements. The grooming elements serve to deeply treat the fur of an animal to be brushed and the combing elements serve to comb out and smooth the fur. Design and arrangement of the grooming and combing elements are chosen such that grooming and combing effects of different strengths result depending on the direction in which the brush is passed over the fur. The brush can also be used as clothes brush or for upholstered furniture or carpets.

12 Claims, 6 Drawing Sheets

(56) References Cited

U.S. PATENT DOCUMENTS

| | | | |
|---|---|---|---|
| 7,480,955 B2* | 1/2009 | Hohlbein et al. | 15/111 |
| 7,500,282 B1* | 3/2009 | Park | 15/160 |
| 8,006,705 B2* | 8/2011 | Hurwitz | 132/116 |
| 8,020,244 B2* | 9/2011 | Mashiko | 15/167.1 |
| 2002/0002984 A1* | 1/2002 | Loy | 134/6 |
| 2004/0154118 A1* | 8/2004 | Bohn | 15/114 |
| 2006/0102099 A1* | 5/2006 | Edwards | 119/710 |
| 2008/0014010 A1* | 1/2008 | Bartschi et al. | 401/146 |
| 2008/0105270 A1* | 5/2008 | Walters et al. | 132/112 |
| 2008/0178901 A1* | 7/2008 | Montoli | 132/218 |

\* cited by examiner

BRUSH

The present invention relates to a brush according to the generic part of the independent claim.

A brush of the generic type intended for grooming domestic animals, especially cats and dogs, is known e.g. from document U.S. Pat. No. 5,485,807. The grooming brush described therein has mainly a grooming effect but is only of limited suitability for combing out fur hair and for smoothing the fur.

It is the object of the present invention to improve a brush of the generic type such that it can be universally used for all aspects of animal grooming, especially of cats and dogs. At the same time, however, it shall also be suitable for use as clothes brush and for upholstered furniture, carpets etc.

The solution of the problem underlying the present invention consists in the brush according to this invention as characterised in the characterising part of the independent claim. Preferred embodiments and developments are the subject matter of the dependent claims.

According to the main idea of this invention, the brush is provided not only with grooming elements but also with tooth-like combing elements. This permits on the one hand to deeply treat the fur of the animal to be groomed by means of the grooming elements and on the other hand to comb out the fur and to then smooth it with the combing elements.

The grooming and combing elements are preferably formed and arranged in such a manner that a grooming and combing effect results that is direction-dependent. In a first direction the grooming or combing effect is stronger and in a second direction perpendicular thereto weaker, and in the directions in between the grooming or combing effect takes corresponding intermediate values. By suitable choice of the direction of treatment, i.e. the direction in which the brush is passed over the fur to be treated, optimal adaptation to the type and state of the fur to be groomed can be attained.

The grooming elements are preferably shaped like truncated cones having an oval or elliptical cross-section. Because of this the individual grooming elements have different deformation stiffnesses in different directions and the grooming effect is correspondingly direction-dependent.

The combing elements are preferably formed by slightly curved double rows of teeth. In the longitudinal direction of the double rows of teeth, the teeth of the double rows of teeth each have a delta-shaped profile, and in the direction transverse thereto each pair has an approximately M-shaped profile. This produces a combing effect which is direction-dependent.

The body of the brush is ergonomically shaped and to this end is preferably provided with a concave shape at one side edge and at the opposite side edge with two concave areas separated by a convex area. Because of this design the brush sits particularly well in the hand.

Hereinbelow the invention is illustrated by means of the drawing. They show.

Figure 1:
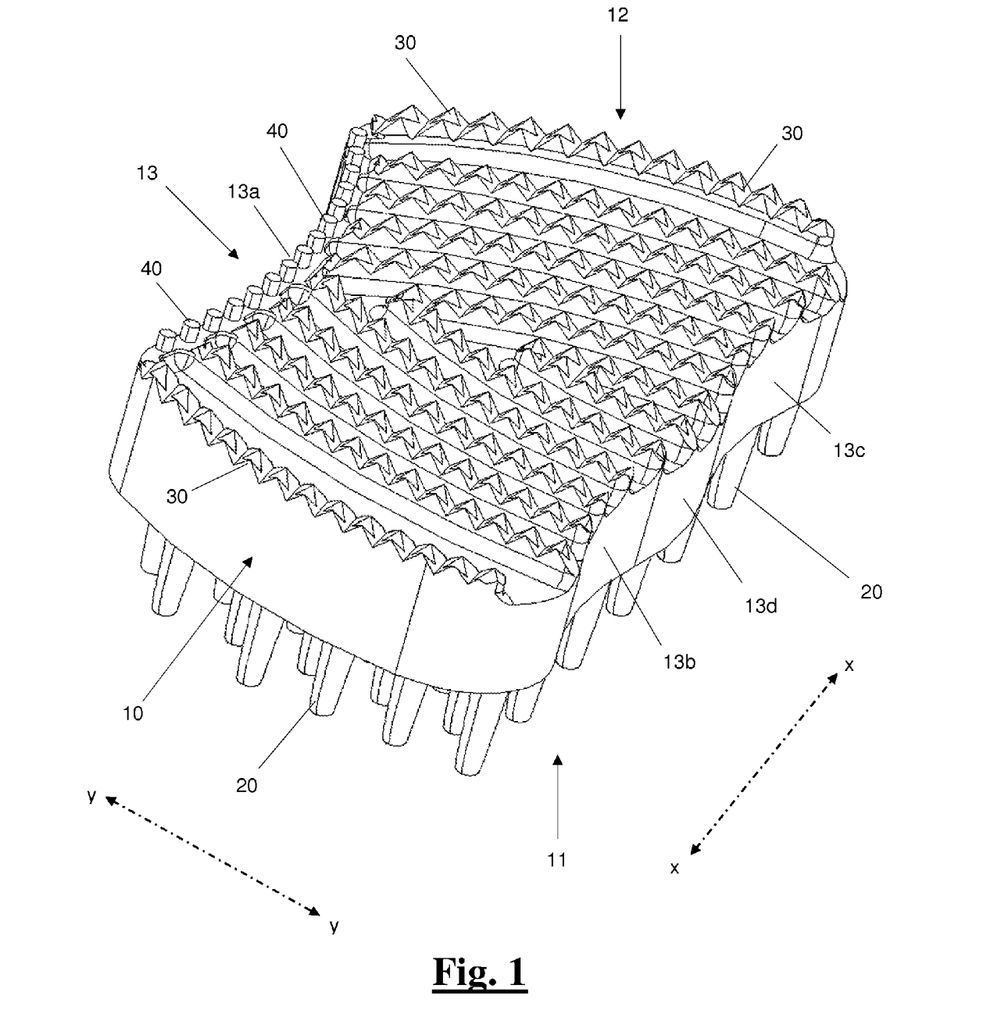
FIG. 1 a full oblique view of a first embodiment of the brush according to this invention, FIG. 2 an oblique view of the brush acc. to FIG. 1 from its grooming side, FIG. 3 an elevation of the grooming side of the brush, FIG. 4 an enlarged detail view of the brush on its combing side, FIG. 5 an oblique view of a second embodiment of the brush according to this invention from its combing side, FIG. 6 an oblique view of the second embodiment of the brush according to this invention from its grooming side, FIG. 7 an enlarged detail view of the second embodiment of the brush according to this invention on its combing side, FIG. 8 an oblique view of a third embodiment of the brush according to this invention from its combing side, FIG. 9 an oblique view of the third embodiment of the brush according to this invention from its grooming side, and FIG. 10 an enlarged detail view of the third embodiment of the brush according to this invention from its combing side.
Figure 2:
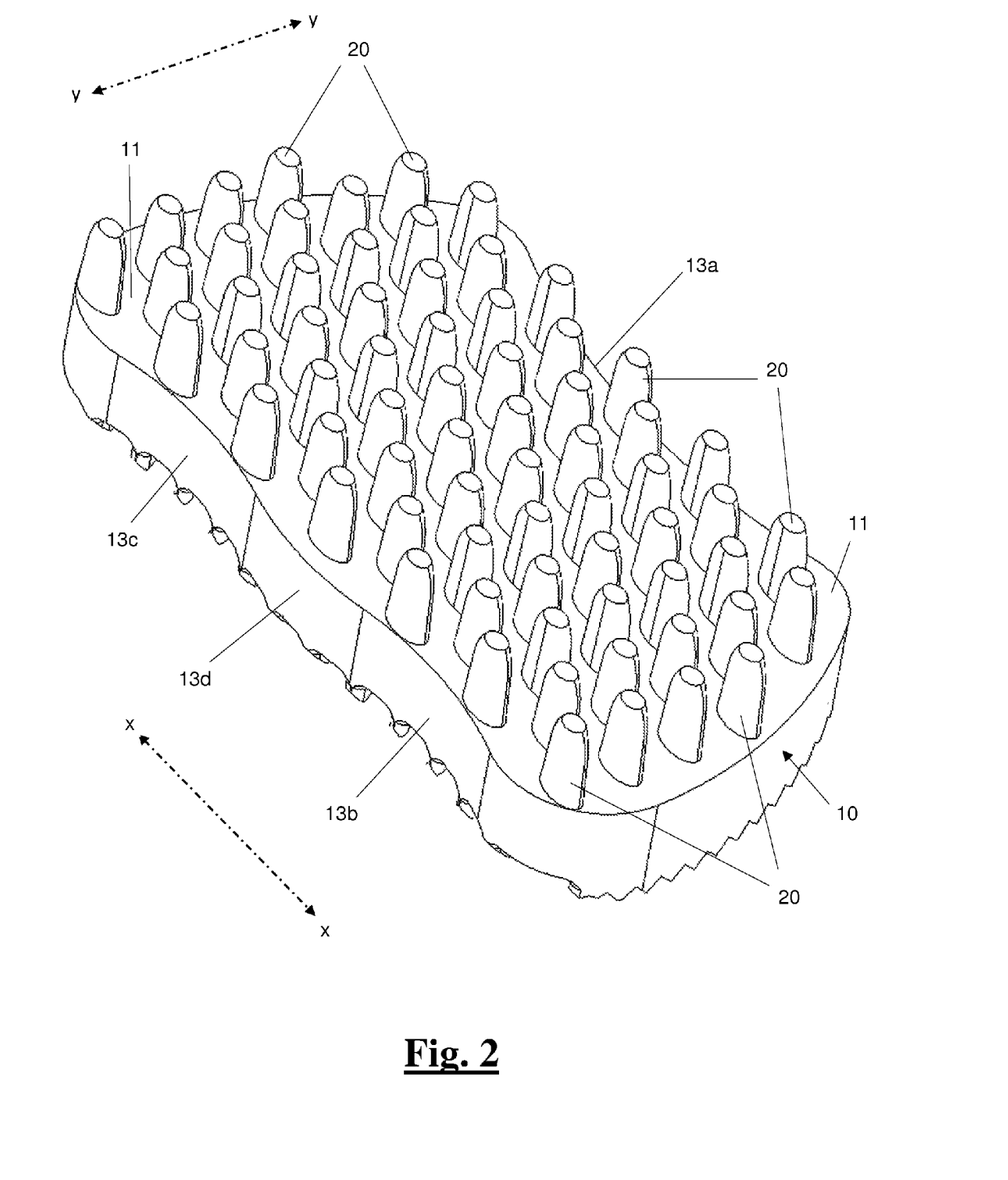
Figure 3:
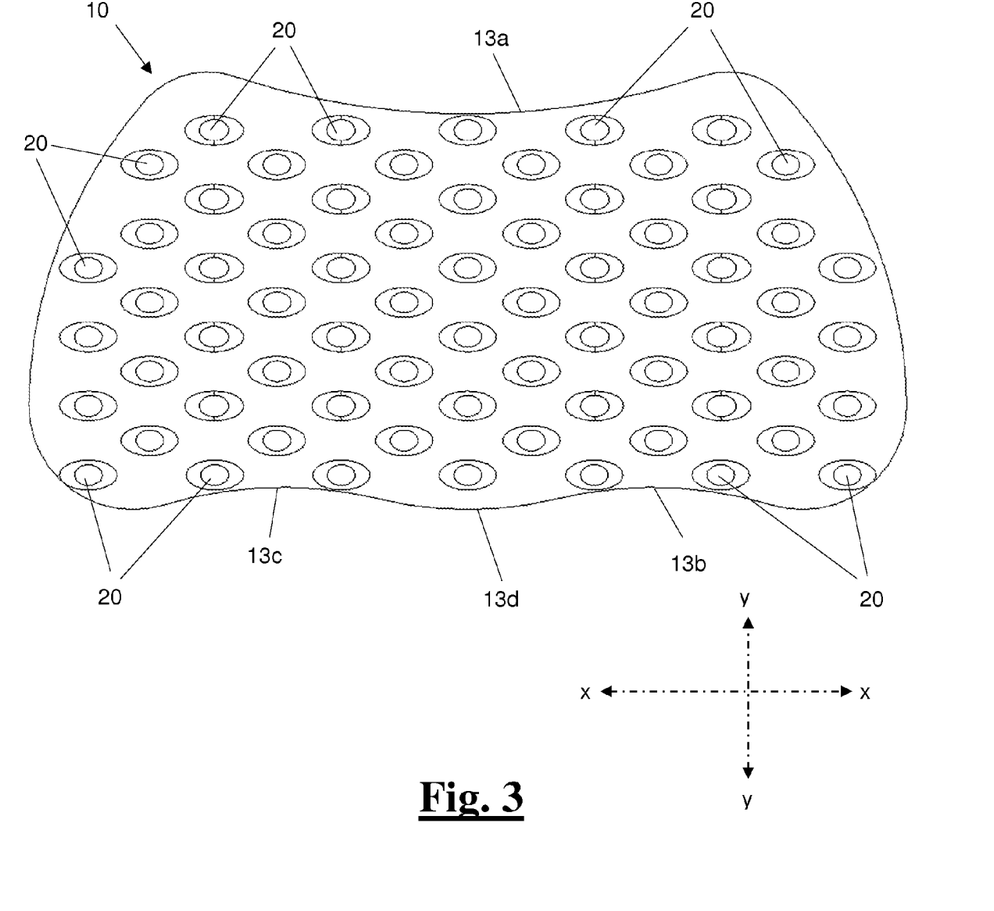

The brush illustrated in the drawing comprises a substantially plate-shaped brush body 10 having a flat bottom side 11 and a flat top side 12 as well as a curved side edge 13. The side edge comprises a first concave area 13a and opposite thereof a second concave area 13b, and a third concave area 13c as well as a fourth convex area 13d separating the two concave areas 13b and 13c. Seen from above or below, the brush body 10 is roughly rectangular with rounded corners. The direction of the longer sides of the brush body will hereinafter be called x-direction, the direction of the shorter sides y-direction. FIG. 3 illustrates this. The brush body 10 consists of an elastically deformable material, e.g. silicone, and in practical use can thus adapt itself snuggly to the body shape of the animal to be groomed. Depending on the animal to be groomed the elastic material chosen may be somewhat softer (e.g. for cats) or somewhat harder (e.g. for dogs).

At the bottom side 11 a plurality of grooming elements 20 are arranged and at the top side 12 of the brush body 10 there is a plurality of tooth-like combing elements 30 and a row of pin-like prong elements 40.

The brush body 10, the grooming elements 20, the combing elements 30 and the prong elements 40 are preferably formed integrally from an elastic material, for example silicone. Alternatively, the brush body 10 can also consist of two interconnected layers, the grooming elements 20 being integrally formed with the one layer and the combing elements 30 and the prong elements 40 with the other layer.

The grooming elements 20 are arranged in parallel rows, the grooming elements of adjacent rows being staggered relative to each other. They are substantially formed like truncated cones and have an oval or elliptical cross-section. This may be seen particularly well in FIGS. 2 and 3. The grooming elements 20 consist of an elastic material, e.g. silicone, having a shore hardness in the range of about 25-45. Due to the elliptical cross-section their deformation stiffness is slightly higher in the x-direction than transverse thereto in y-direction. The grooming elements 20 are, for example, about 8 or 4 mm at their base, about 3 mm at their flattened tip and about 12 mm in height.

The tooth-like combing elements 30 at the top side 12 of the brush body 10 are formed as a number of double rows of teeth 31. The double rows of teeth 31 are slightly curved and are spaced in relation to each other. They substantially extend transversely to the longer side of the brush body 10, i.e. substantially in about y-direction.

Figure 4:
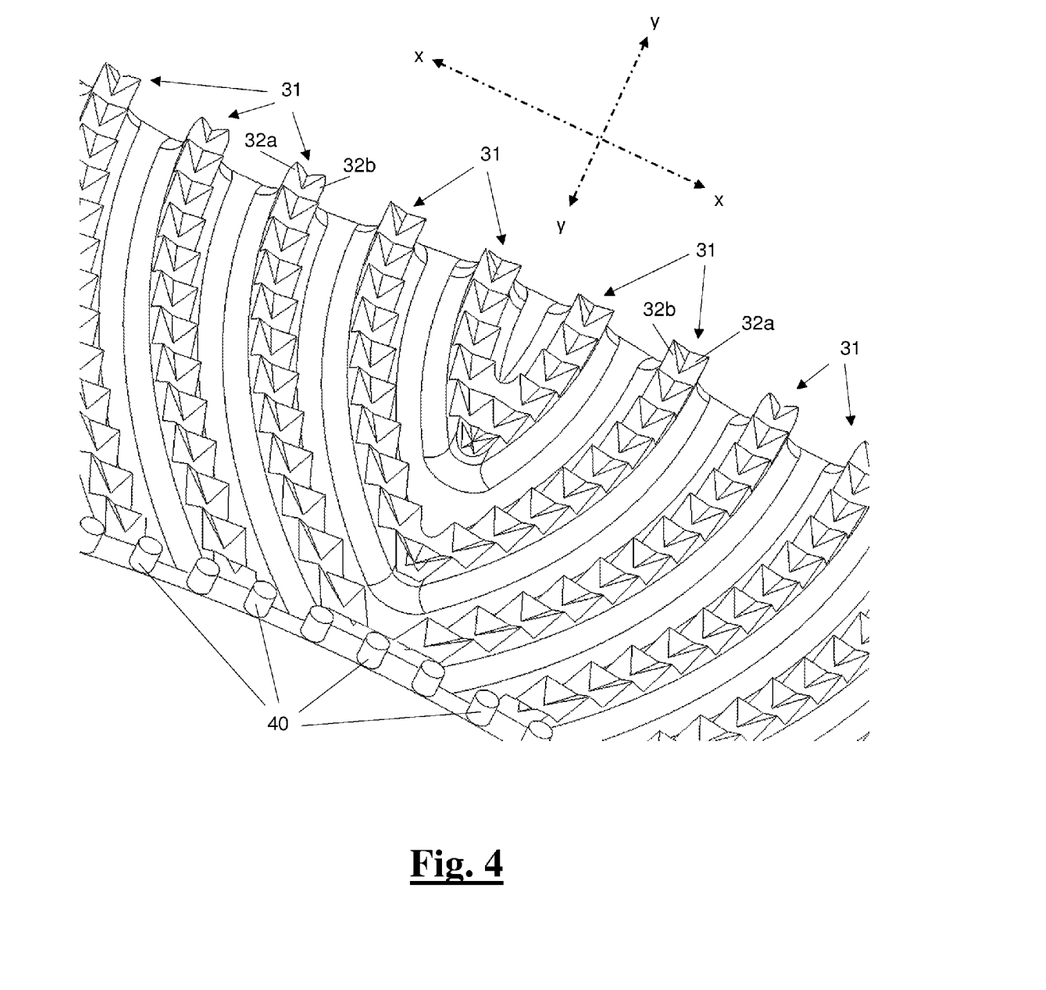

Each double row of teeth 31 consists of a plurality of pairs of teeth 32a, 32b. The two teeth 32a and 32b of each pair of teeth are formed in such a way that the tooth flanks facing away from each other are markedly steeper than the tooth flanks facing each other. In x-direction (seen in y-direction) the pairs of teeth thus have an approximately M-shaped profile. In y-direction (seen in x-direction) the teeth 32a and 32b are substantially symmetrical in form and have a substantially delta-shaped tooth profile. The different tooth profiles result in different combing effects, depending on whether the brush is used in x-direction or in y-direction. The special form of the combing elements 30 can be seen particularly well in the enlarged detail view of FIG. 4.

The pin-like prong elements 40 are arranged in one row along the first concave area 13a of the side edge 13 of the brush body 10. They serve mainly to smooth the fur in the last step of grooming.

The brush is preferably made of plastic (e.g. silicone or silicone-like material) having special shore hardnesses (e.g. for cat or dog), it being possible for the top side with the combing elements to have another shore hardness than the bottom side with the grooming elements. The brush may be manufactured integrally or in several parts in the moulding or injection moulding process. It may have a hollow mould as well as a full mould. It may be unicoloured, multicoloured or also transparent. Using the brush of this invention with adapted shore hardness, the animal fur can be optimally groomed and dehaired without ripping the undercoat (as may be the case with metal curry combs) or even injuring the animal (for example in the eye area).

The brush may be bent three-dimensionally so that it can adjust to the animal body and so that the structured surfaces of the brush unfold their effects optimally during grooming.

The ergonomic form of the brush body and its deformability (due to the choice of material) result in something like an "extended hand", giving the grooming person an optimum sensibility for the animal. Depending on the choice of material said brush body can warm slightly through being clasped in the hand of the grooming person which further increases the body sensibility for the animal.

The grooming elements are designed a bit harder in order to warrant the deep intrusion down to the undercoat. But they are still sufficiently pliable to preclude any risk of injury.

The shape of the grooming elements is chosen such that depending on the direction in which they are run through the fur they act in plough-like or stripping fashion. The tips of the grooming elements, i.e. the part intruding into the fur, are flattened or thornlike. The grooming elements are staggered so that the grooming elements provide an optimal loosening effect. Because of the design and form as well as the flexibility of the grooming elements the undercoat of the animal does not get damaged.

Due to the special design of the tooth-like combing elements at the top side of the brush body dead fur hairs are caught, gently pulled out and brought into a transverse position. In this position the combed out removed hairs gather into small rolls so that no hairs fly around in the surroundings (unhygienic, allergic persons) and the little rolls can be quickly and effortlessly and very hygienically removed and disposed of after grooming.

Because of the plurality of combing elements at the top side of the brush the overall pressure of the surface of the hand is distributed such that they do not discomfort the hand. A slight 3-D pillow shape of the entire implement is conceivable without this changing the structural form.

Because of the direction-dependent different tooth profiles and the slight curve of the double rows of teeth, the surface effect on the animal fur is even more comprehensive/better and—according to tests—most pleasant for the animal.

The brush of this invention is also suitable for professional use. On the other hand it also provides children (pedagogically) and possibly handicapped people (therapeutically) with a valuable and in every respect risk-free and harmless instrument for establishing contact with an animal through grooming.

Figure 5:
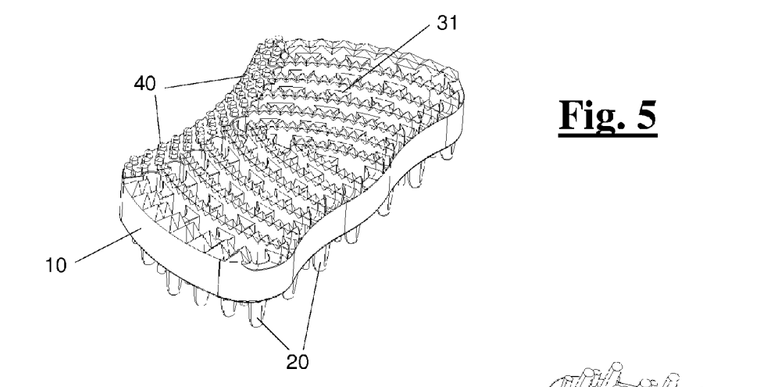
Figure 6:
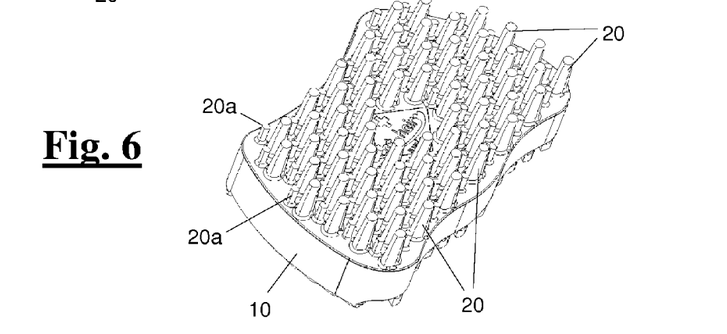
Figure 7:
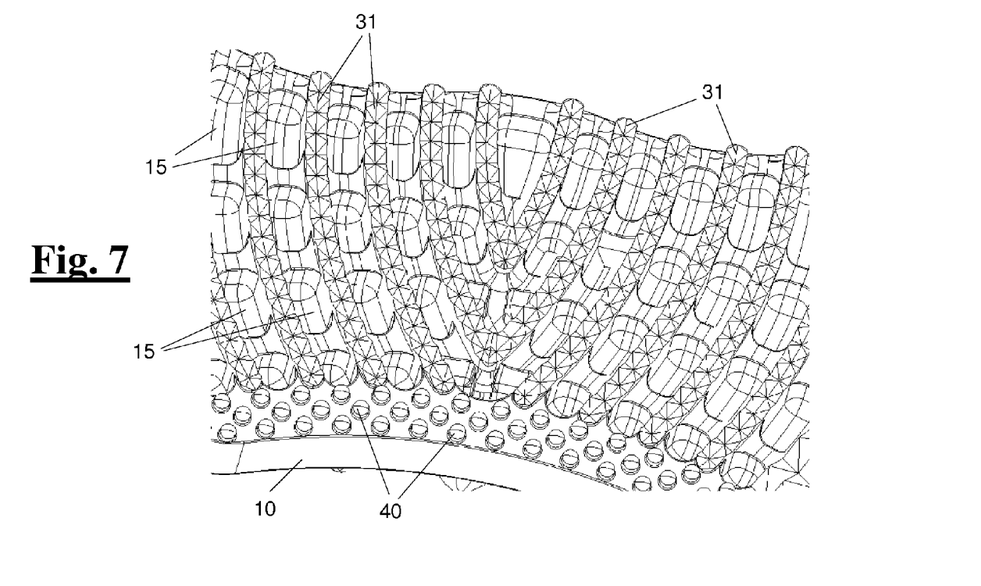

FIGS. 5-7 show a second embodiment of the brush which, like the first embodiment, is also especially suitable for use as fur brush. On the grooming side of the brush body 10 still smaller, shorter grooming elements 20a are arranged between the grooming elements 20. On the combing side, several rows of prong elements 40 are provided instead of one row. The brush body 10 has numerous hollow spaces 15 providing it with enhanced deformability and thus adaptability. This also results in savings in material. Apart from this the brush is formed according to the same principles as the embodiments of FIGS. 1-4.

Figure 8:
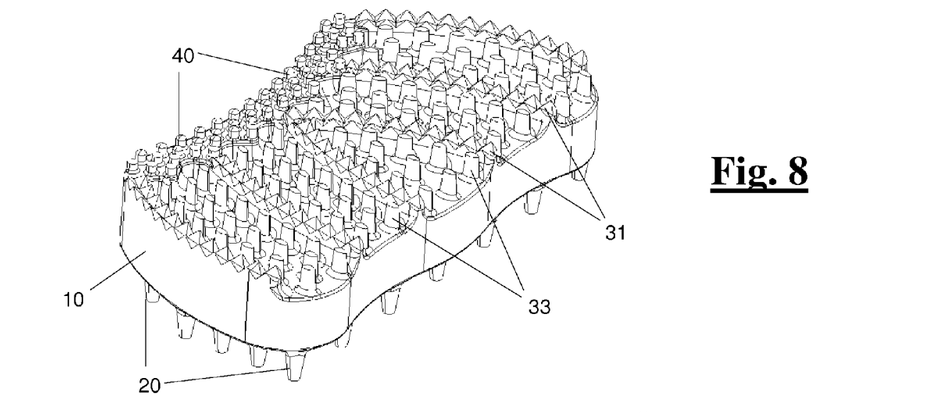
Figure 9:
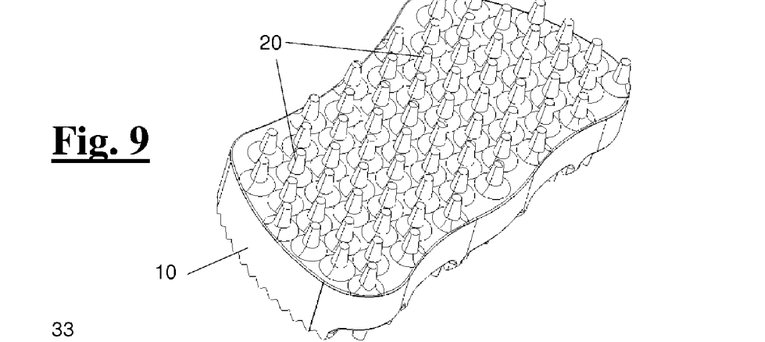
Figure 10:
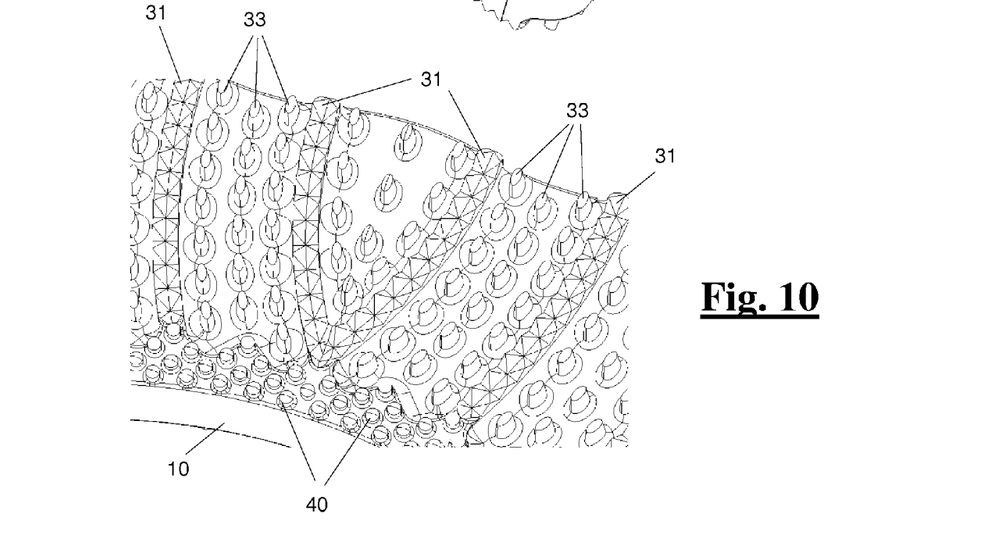

Lastly, FIGS. 8-10 illustrate a third embodiment of the brush according to this invention, which is suitable in particular as clothes brush or for upholstered furniture and carpets. In this embodiment there are slightly fewer double rows of teeth 31 present on the combing side of the brush body 10, but between the individual double rows of teeth 31 there are several also slightly curved single rows of teeth 33, the teeth of which are formed substantially the same as the grooming elements 20. Also on the combing side of the brush body 10 several rows of prong elements 40 are provided. Apart from this the brush is formed according to the same principles as the embodiment of FIGS. 1-4.

What is claimed is:

1. A brush, comprising:
    a substantially plate-shaped, elastically deformable brush body which has a substantially flat top side and a substantially flat bottom side and curved side edges as well as elastic and substantially conical grooming elements arranged at the bottom side, wherein tooth-like combing elements are arranged at the top side of the brush body;
    wherein the grooming elements at the bottom side and the combing elements at the top side are formed and arranged such that when the brush is used in directions perpendicular to each other, different grooming and combing effects are attained;
    wherein in a first direction the combing elements have a different tooth profile than in a second direction perpendicular thereto;
    wherein the combing elements form double rows of teeth spaced in relation to each other and extend substantially transversely to a first direction; and
    wherein each double row of teeth has a plurality of pairs of teeth arranged one after the other, the two teeth of each pair of teeth being arranged side by side transversely to the longitudinal direction of the double row of teeth and having a tooth flank less steep on the sides facing each other than on the sides facing away from each other, so that the pairs of teeth have a substantially M-shaped profile in the direction transverse to the longitudinal direction.

2. Brush according to claim 1, wherein in the longitudinal direction of the double row of teeth the teeth each have a substantially delta-shaped profile.

3. Brush according to claim 1, wherein the grooming elements have a greater deformation stiffness in a first direction than in a second direction perpendicular thereto.

4. Brush according to claim 3, wherein the grooming elements have a substantially oval or elliptical cross-section, the longer cross-sectional axes being substantially parallel to the first direction.

5. Brush according to claim 3, wherein the grooming elements are arranged in parallel rows, the grooming elements of adjacent rows being staggered relative to each other.

6. Brush according to claim 1, wherein the grooming elements are substantially formed like truncated cones.

7. Brush according to claim 1, wherein the double rows of teeth are slightly curved.

8. Brush according to claim 1, wherein at the top side of the brush body at least one row of pin-like prong elements is arranged along a first area of the side edge.

9. Brush according to claim 8, wherein the brush body, the grooming elements and the combing elements as well as the prong elements are integrally formed from the same material.

10. Brush according to claim 1, wherein a first area of the side edge of the brush body is concave.

11. Brush according to claim 10, wherein a second area and a third area of the brush body is concave, the second and third area being opposite the first area and being separated by a fourth convex area.

12. Brush according to claim 1, wherein the brush body is elastically deformable.

* * * * *